(12) United States Patent
Onodera et al.

(10) Patent No.: US 8,770,232 B2
(45) Date of Patent: Jul. 8, 2014

(54) METHOD FOR MANUFACTURING CLIMATE CONTROL DUCT, AND CLIMATE CONTROL DUCT

(75) Inventors: Masaaki Onodera, Yamato (JP); Yoshitaka Matsubara, Yamato (JP); Naoto Tani, Nagoya (JP); Kazuo Waki, Nagoya (JP)

(73) Assignee: Kyoraku Co., Ltd., Kyoto (JP)

( * ) Notice: Subject to any disclaimer, the term of this patent is extended or adjusted under 35 U.S.C. 154(b) by 903 days.

(21) Appl. No.: 12/893,782

(22) Filed: Sep. 29, 2010

(65) Prior Publication Data

US 2011/0073211 A1 Mar. 31, 2011

(30) Foreign Application Priority Data

Sep. 30, 2009 (JP) ................................. 2009-228875
Aug. 24, 2010 (JP) ................................. 2010-187295

(51) Int. Cl.
*F16L 11/11* (2006.01)

(52) U.S. Cl.
USPC .......................................................... 138/121

(58) Field of Classification Search
CPC ................................ F16L 11/11; F16L 11/111
USPC .......................................... 138/109, 121, 38
See application file for complete search history.

(56) References Cited

U.S. PATENT DOCUMENTS 5,792,532 A * 8/1998 Pfleger .......................... 428/36.9
5,960,870 A * 10/1999 Takahashi et al. ............. 165/181
6,119,731 A * 9/2000 Nakagawa et al. ............ 138/121
2004/0060609 A1 * 4/2004 Fatato et al. ................... 138/121
2004/0074554 A1 * 4/2004 Starita ............................ 138/137
2006/0213567 A1 * 9/2006 Parpart et al. ................. 138/121
2010/0300569 A1 * 12/2010 Degen et al. .................. 138/121

FOREIGN PATENT DOCUMENTS

| JP | 07-257149 | 10/1995 |
| JP | 2001-042626 | 2/2001 |
| JP | 2004-195695 | 7/2004 |
| JP | 2005-035184 | 2/2005 |
| JP | 2005-193726 | 7/2005 |
| JP | 2006-017392 | 1/2006 |

OTHER PUBLICATIONS

Japanese Office Action dated Feb. 18, 2014, from corresponding Japanese Application No. 2010-187295.

* cited by examiner

*Primary Examiner* — James Hook
(74) *Attorney, Agent, or Firm* — Troutman Sanders LLP

(57) ABSTRACT

The invention provides a method for manufacturing a climate control duct, the method capable of improving a characteristic of transferring a shape of a protrusion onto a surface of a duct and capable of preventing reduction in ventilation efficiency. In order to manufacture a climate control duct having a protrusion formed on an outer peripheral surface thereof, the method includes subjecting an extruded foamed resin to blow molding by use of a duct-shaped mold in which a groove for transfer of a shape of the protrusion is formed on at least part of a surface thereof. Herein, the following relations are satisfied: 0.5 mm<D<5 mm, D<W<4×D, and W<2×T, in which W represents a width of the groove, D represents a depth of the groove, and T represents a thickness of the foamed resin.

2 Claims, 6 Drawing Sheets

METHOD FOR MANUFACTURING CLIMATE CONTROL DUCT, AND CLIMATE CONTROL DUCT

CROSS-REFERENCE TO RELATED APPLICATION

This application is based on Japanese Patent Applications Nos. 2009-228875 filed with the Japan Patent Office on Sep. 30, 2009 and 2010-187295 filed with the Japan Patent Office on Aug. 24, 2010, the entire contents of which are hereby incorporated by reference.

BACKGROUND

1. Technical Field

The present invention relates to a method for manufacturing a climate control duct for use in automobiles and the like, and also relates to such a climate control duct.

2. Related Art

There has been known a climate control duct for vehicles, which guides climate control air to be supplied from an air conditioner unit into a desired site (e.g., refer to Patent Document 1). The climate control duct for vehicles has lattice-shaped protuberances formed on an outer peripheral surface thereof. The protuberance is allowed to prevent a drop of condensed moisture adhering to the surface of the duct.

There has also been known a duct for air coolers, which is formed of a blow-molded foam (e.g., refer to Patent Document 2). The duct for air coolers is excellent in heat insulating property because of a large number of independent bubbles contained therein. In addition, the duct for air coolers has a groove formed on an outer peripheral surface thereof, and the groove is formed in a "V" shape when being seen in a cross section thereof. The groove is allowed to prevent a drop of condensed moisture because the condensed moisture is retained at a bottom thereof. Herein, the duct has a protrusion formed on an inner circumferential surface thereof in correspondence with the groove. The protrusion is allowed to prevent an increase in amount of condensed moisture adhering to the outer peripheral surface so as to encourage stagnation of air flow near the inner circumferential surface.

The documents that describe the related art are listed below.

Patent Document 1: JP 07-257149 A
Patent Document 2: JP 2006-017392 A

With regard to conventional climate control ducts such as the climate control duct described in Patent Document 1 and the duct described in Patent Document 2, however, when an outer peripheral surface is configured to have irregularities formed thereon, an inner circumferential surface is also configured to have irregularities formed thereon (e.g., see FIG. 10 in Patent Document 1 and see FIG. 4 in Patent Document 2). These irregularities result in stagnation of air near the inner circumferential surface of the climate control duct to hinder climate control air from passing through the duct. Consequently, there arises a problem that the irregularities formed on the inner circumferential surface causes reduction in ventilation efficiency.

In a case of molding a climate control duct in such a manner that a foamed resin is subjected to blow molding, further, the foamed resin is not embedded so much in a groove of a mold. Consequently, there is a possibility that a shape of a protrusion to be formed on the outer peripheral surface of the duct differs from a target shape. In this case, further, there is a possibility that the duct fails to satisfactorily exhibit the advantage of preventing the drop of condensed moisture.

SUMMARY

The present invention has been devised in view of the circumstances described above. It is one object of the present invention to provide a method for manufacturing a climate control duct, the method capable of improving a characteristic of transferring a shape of a protrusion onto a surface of a duct and capable of preventing reduction in ventilation efficiency. It is another object of the present invention to provide a climate control duct capable of allowing a protrusion formed on a surface thereof to retain condensed moisture with increased reliability and capable of improving ventilation efficiency.

(1) The present invention provides a method for manufacturing a climate control duct having a protrusion formed on an outer peripheral surface thereof. The method includes molding an extruded foamed resin by use of a duct-shaped mold, in which a groove for transfer of a shape of the protrusion is formed on at least part of a surface thereof, while fitting the foamed resin to the shape of the mold by use of a pressurized fluid. Herein, the following relations are satisfied:

$0.5 \text{ mm} < D < 5 \text{ mm}$, $D < W < 4 \times D$, and $W < 2 \times T$, in which W represents a width of the groove, D represents a depth of the groove, and T represents a thickness of the foamed resin.

According to this configuration, in the mold, the width W of the groove is larger than the depth D of the groove. As a result, the foamed resin is embedded in the groove of the mold with ease at the time of molding. Therefore, it is possible to form a protrusion which satisfactorily protrudes from the surface of the duct.

Further, the width W of the groove of the mold is smaller than two times of the thickness T of the foamed resin. As a result, even in a case where the foamed resin is embedded in the groove, a deep recess is hard to be formed on an inner circumferential surface of the duct. Therefore, it is possible to prevent ventilation of gas in the duct from being hindered.

Herein, the foamed resin may be extruded in a cylinder shape or in a sheet shape.

(2) Preferably, the groove has an inner surface subjected to blasting.

According to this configuration, air interposed between the inner surface of the groove and the foamed resin is escaped externally with ease at the time of molding. As a result, the foamed resin is embedded in the groove with ease.

(3) Preferably, the inner surface of the groove has a degassing hole opened thereon so as to communicate with an outside of the mold.

According to this configuration, air interposed between the inner surface of the groove and the foamed resin is escaped externally with ease at the time of molding. As a result, the foamed resin is embedded in the groove with ease.

(4) Preferably, an angle of the dug groove is not less than 45°.

According to this configuration, a protrusion on the surface of the molded duct becomes large in rise angle. Therefore, it is possible to retain condensed moisture with increased reliability by virtue of the protrusion.

(5) The present invention also provides a climate control duct obtained by molding a foamed resin while fitting the foamed resin to a shape of a mold by use of a pressurized fluid. The duct includes a protrusion formed on an outer peripheral surface thereof. Herein, the following relations are satisfied:

$$0.5 \text{ mm} < Ha < 5 \text{ mm},$$

$$2 \times Ha < Wa < 5 \times Ha,$$

$$Wa < 3 \times Ta, \text{ and}$$

$$Da/Ha < 0.7, \text{ in which}$$

Wa represents a width of the protrusion, Ha represents a height of the protrusion, Ta represents a thickness of a wall at a portion where the protrusion is not formed, and Da represents a depth of a groove to be formed on an inner circumferential surface in correspondence with the protrusion.

According to this configuration, the protrusion satisfactorily protrudes from the surface of the duct, and therefore retains condensed moisture adhering to the surface with ease. Therefore, it is possible to prevent a drop of condensed moisture from the duct.

Further, the depth Da of the groove to be formed on the inner circumferential surface of the duct in correspondence with the protrusion is small. Therefore, it is possible to prevent ventilation of gas in the duct from being hindered.

(6) Preferably, the protrusion has a rise angle of not less than 45°.

According to this configuration, it is possible to retain condensed moisture with increased reliability by virtue of the protrusion.

According to the present invention, it is possible to provide a method for manufacturing a climate control duct, the method capable of improving a characteristic of transferring a shape of a protrusion onto a surface of a duct and capable of preventing reduction in ventilation efficiency. According to the present invention, it is also possible to provide a climate control duct capable of allowing a protrusion formed on a surface thereof to retain condensed moisture with increased reliability and capable of improving ventilation efficiency.

BRIEF DESCRIPTION OF THE DRAWINGS

The foregoing and other objects, features, aspects and advantages of the invention will become more apparent from the following detailed description when taken in conjunction with the accompanying drawings, in which.

DESCRIPTION OF EMBODIMENTS

Figure 1:
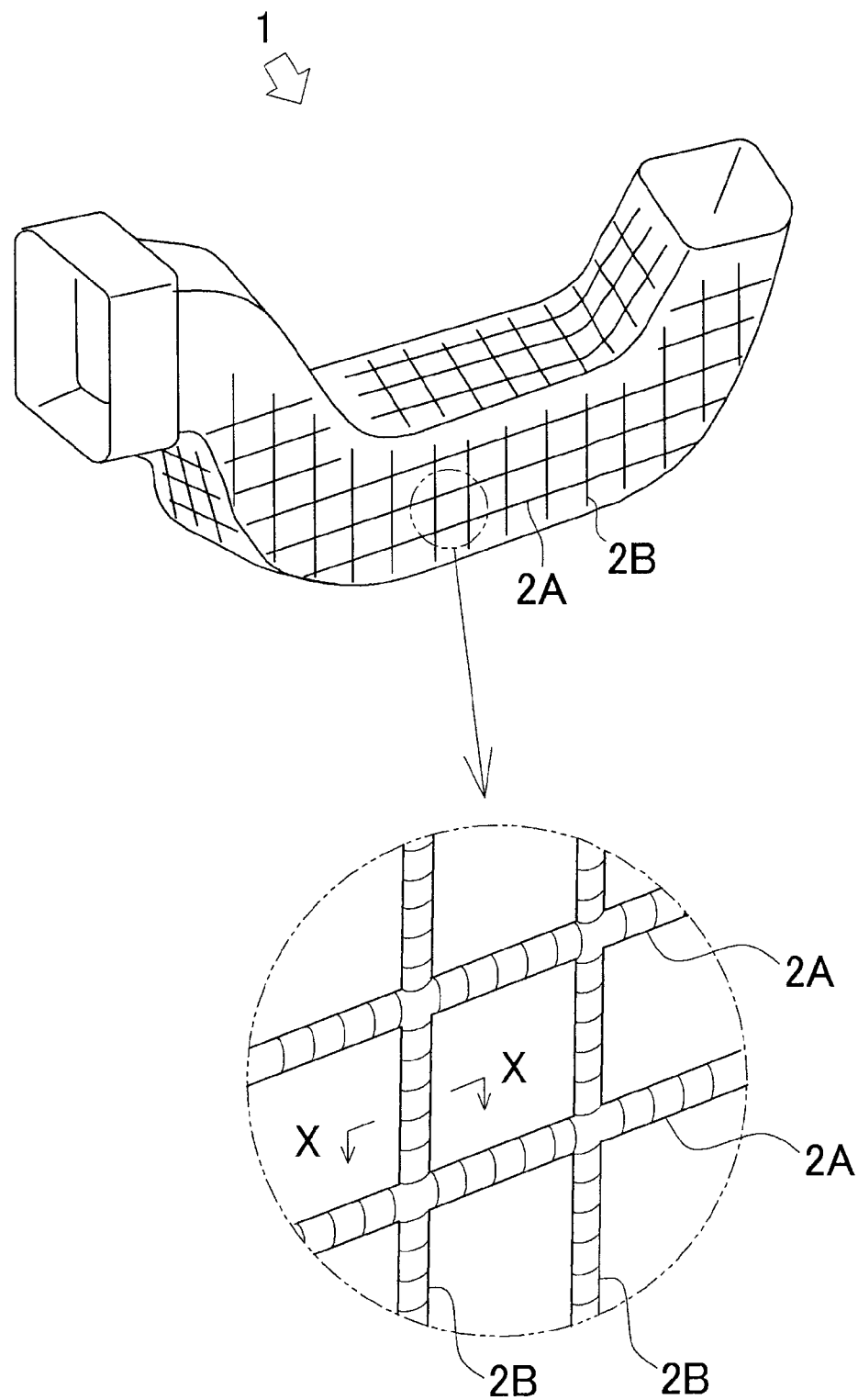
FIG. 1 is a general schematic view illustrating a duct according to one embodiment.

Preferred embodiments of the present invention will be described below with reference to the accompanying drawings, in which like reference characters designate similar or identical parts throughout the several views thereof.

FIG. 1 is a general schematic view illustrating a duct 1 according to one embodiment of the present invention.

The duct 1 is a climate control duct for use in a side vent provided near a driver seat of an automobile, and is molded in such a manner that a foamed resin is subjected to blow molding.

A foamed resin to be used herein may principally contain a polypropylene-based resin, for example. Herein, a polypropylene-based resin to be used herein may be mixed with a hydrogen-added styrene-based thermoplastic elastomer.

A polypropylene-based resin to be used herein is not particularly limited. However, there is preferably used a polyolefin-based resin having an ethylene unit or a propylene unit in a molecule. Examples of this resin may include a polypropylene resin, an ethylene-propylene block copolymer, and the like.

A foaming agent to be used herein may be a physical foaming agent or a chemical foaming agent. Herein, a physical foaming agent and a chemical foaming agent may be used together. Examples of a physical foaming agent may include inorganic foaming agents such as air, carbonic acid gas, nitrogen gas and water, organic foaming agents such as butane, pentane, hexane, dichloromethane and dichloroethane, and the like. Moreover, examples of a chemical foaming agent may include sodium bicarbonate, citric acid, sodium citrate, azodicarbonamide and the like.

As illustrated in FIG. 1, in an outer peripheral surface of the duct 1, protrusions are formed on two side surfaces, a bottom surface and a top surface so as to protrude from the respective surfaces. The protrusions include a plurality of first protrusions 2A extending in a longitudinal direction of the duct 1, and a plurality of second protrusions 2B formed so as to intersect the first protrusions. These protrusions are formed integrally with a main body of the duct 1 by blow molding.

Condensed moisture generated on the surface of the duct is retained at a recessed area surrounded with the first protrusions 2A and the second protrusions 2B. Thus, it is possible to prevent a downward drop of the condensed moisture from the duct.

Figure 2:
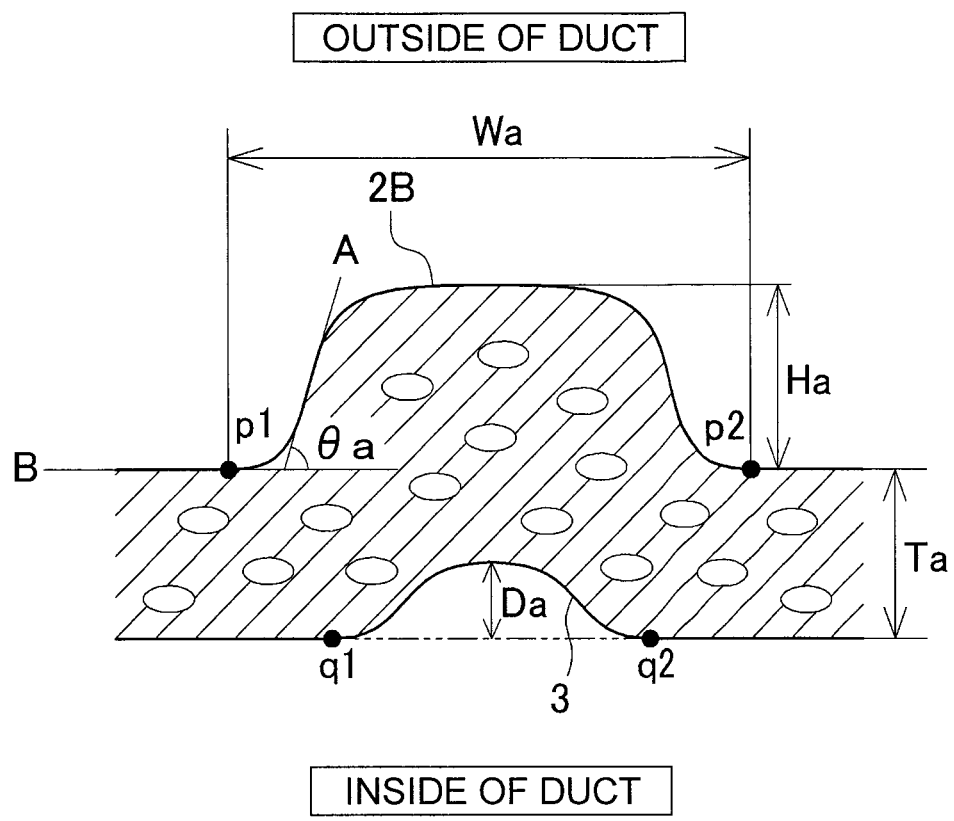
FIG. 2 is a sectional diagrammatic view illustrating the duct taken along a line X-X in FIG. 1.

FIG. 2 is a sectional diagrammatic view illustrating the duct 1 taken along a line X-X in FIG. 1.

In FIG. 2, Ha represents a height of the second protrusion 2B protruding from the outer surface of the duct, Wa represents a width of the second protrusion 2B in a longitudinal vertical section (a cross section which is perpendicular to a direction of extension of the second protrusion 2B), Da represents a depth of a groove 3 formed on an inner surface of the duct in correspondence with the second protrusion 2B, and Ta represents a thickness of a sidewall of the duct.

Herein, the following relations are satisfied:

$$0.5 \text{ mm} < Ha < 5 \text{ mm},$$

$$2 \times Ha < Wa < 5 \times Ha,$$

$$Wa < 3 \times Ta, \text{ and}$$

$$Da/Ha < 0.7.$$

The width Wa of the protrusion is measured as a clearance between ends p1 and p2 of plane portions located on both sides of the protrusion in the vertical section of the protrusion (i.e., the cross section which is perpendicular to the direction of extension of the protrusion). Moreover, the height Ha of the protrusion is measured as a distance from an apex of the protrusion to a straight line connecting between the ends p1 and p2 of the plane portions located on both the sides of the protrusion. Further, the depth Da is measured as a distance from a deepest position of the groove 3 to a straight line connecting between ends q1 and q2 of plane portions located on both sides of the groove 3.

The thickness Ta of the sidewall of the duct is determined in accordance with the following procedure. That is, this procedure involves cutting the duct in a direction which is perpendicular to the direction of extension of the protrusion, measuring thicknesses of two plane portions (portions where no protrusion is formed) located on both sides of the protrusion in the vertical section, respectively, and determining an average value of the thicknesses of the two plane portions. This average value corresponds to the thickness Ta.

For example, the duct 1 according to this embodiment can be formed such that Ha becomes equal to 0.8 mm, Wa becomes equal to 2.8 mm, Ta becomes equal to 1.5 mm and Da becomes equal to 0.5 mm with regard to the second protrusion 2B.

Moreover, the first protrusion 2A to be formed herein is equal in Ha, Wa, Da and Ta to the second protrusion 2B.

It is not indispensable for the first protrusion 2A and the second protrusion 2B to be equal to each other with regard to Ha, Wa, Da and Ta. With regard to Ha, Wa, Da and Ta, the protrusions 2A and 2B may be changed appropriately within such a range as to satisfy the relations described above.

As illustrated in FIG. 2, moreover, the second protrusion 2B has a sectional contour which is gently curved from the sidewall of the duct to the apex of the protrusion.

Further, the second protrusion 2B is formed such that an angle θa between a predetermined tangent A which comes into contact with the sectional contour of the second protrusion 2B and a plane B which is identical with the sidewall of the duct (hereinafter, referred to as a rise angle θa) is larger than 45°. Among tangents coming into contact with the sectional contour of the second protrusion 2B, the predetermined tangent A corresponds to one which is largest in gradient with respect to the plane B.

(Method of Molding Duct)

The duct 1 can be molded in accordance with the following method.

Figure 3:
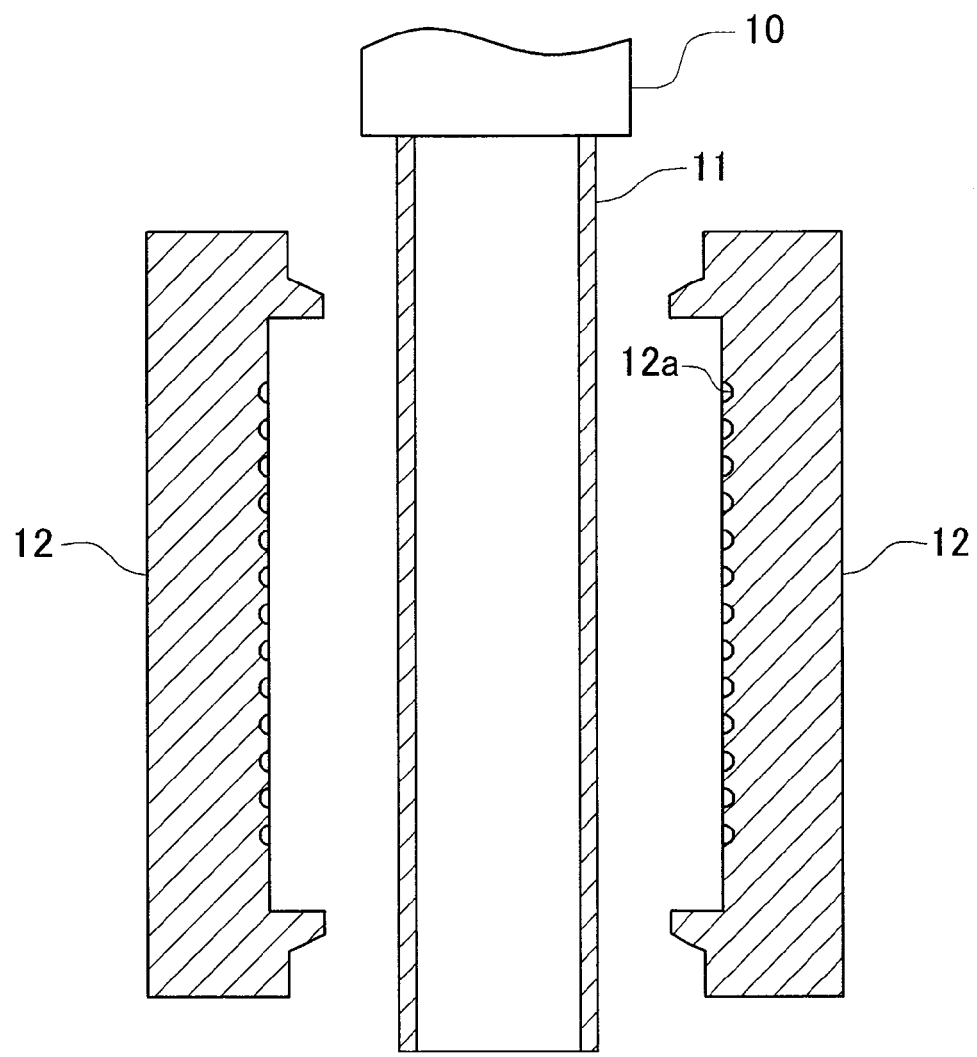
FIG. 3 is a sectional diagrammatic view illustrating a method of forming the duct illustrated in FIG. 1 by blow molding.

FIG. 3 is a sectional diagrammatic view illustrating the method of forming the duct 1 illustrated in FIG. 1 by blow molding.

First, a foamed resin mixture is kneaded in an extruder (not illustrated), and then is retained at an accumulator (not illustrated) in a die. Next, when the foamed resin mixture is retained by a predetermined amount, a ring-shaped piston (not illustrated) is pressed down in a vertical direction with respect to a horizontal direction.

The foamed resin mixture is extruded as a cylinder-shaped foamed parison 11 (a foamed resin) from a die slit of an extrusion head 10 illustrated in FIG. 3 toward a position between split mold blocks 12 at an extrusion speed of not less than 700 kg/hr.

Thereafter, the parison 11 is inserted between the split mold blocks 12 in such a manner that the split mold blocks 12 are clamped. Further, air (a pressurized fluid) is blown into the parison 11 at a pressure within a range from 0.05 to 0.15 MPa. Thus, the duct 1 is formed.

Herein, it is not indispensable to extrude the foamed resin in a cylinder shape. For example, the duct 1 may be molded as follows. That is, the foamed resin is extruded in a sheet shape. Then, this sheet-shaped foamed resin is pushed into the mold by use of a pressure of air (a pressurized fluid) so as to be closely attached to the mold.

Moreover, it is not indispensable to obtain the foamed molded body by the blow molding as described above. For example, the foamed molded body may be obtained by vacuum forming that involves attaching the extruded foamed resin to the mold 12 by suction to mold the foamed resin into the predetermined shape.

Figure 4:
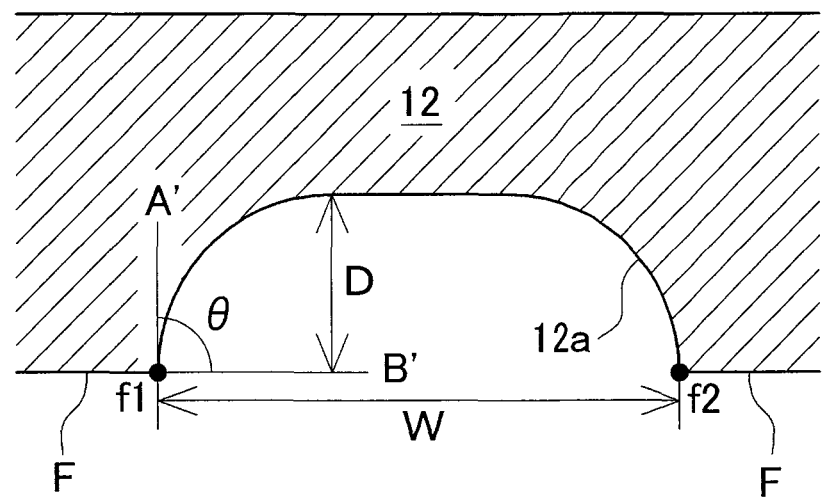
FIG. 4 is an enlarged diagrammatic view illustrating a portion near a surface of a mold illustrated in FIG. 3.
Figure 4:
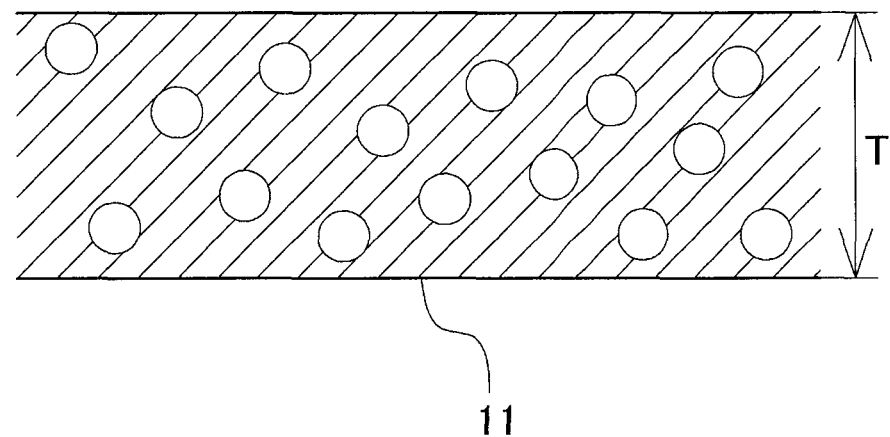

FIG. 4 is an enlarged diagrammatic view illustrating a portion near a surface of the mold illustrated in FIG. 3.

The protrusion to be formed on the surface of the duct is formed in such a manner that a shape of a groove 12a on the mold 12 illustrated in FIG. 4 is transferred onto the surface of the parison 11.

The groove 12a of the mold 12 is formed such that a width W and a depth D satisfy the following relations:

$$0.5\ \text{mm} < D < 5\ \text{mm, and}$$

$$D < W < 4 \times D.$$

Herein, the width W of the groove is measured as a clearance between ends f1 and f2 of mold plane portions F located on both sides of the groove, in a vertical section of the groove (i.e., a cross section which is perpendicular to a direction of extension of the groove). Moreover, the depth D is measured as a distance from a deepest position in the groove to a straight line connecting between the ends f1 and f2 of the mold plane portions F located on both the sides of the groove.

For example, the groove 12a of the mold 12 is formed to satisfy relations: D=1 mm, and W=3 mm.

As illustrated in FIG. 2, in this embodiment, both the sides in the groove width direction are formed to have an arc shape which is 1 mm in radius. Moreover, the middle portion in the groove width direction is formed to have a plane shape which is 1 mm in width.

In the blow molding, a thickness T of the parison 11 to be extruded is adjusted such that the thickness T of the parison 11 immediately before the parison 11 is inserted between the split mold blocks 12 (immediately before blowing the parison 11) satisfies the following relation:

$$W < 2 \times T.$$

In this embodiment, the parison is extruded from the extruder such that the thickness T of the parison immediately before the parison is inserted between the split mold blocks is set at about 2.5 mm, for example.

The thickness T of the parison is measured as follows.

Water is sprayed onto the parison pushed out from the die slit (i.e., the parison immediately before being inserted between the split mold blocks), so that the parison is cooled and solidified without a blow pressure being applied thereto. Thereafter, the parison is cut in a direction perpendicular to the direction of extrusion, and a thickness of the cut parison is measured in cross section. Herein, the parison is cut at three positions corresponding to an upper end, a center and a lower end of the mold. At each position, thicknesses at six sites are measured at regular intervals in a circumferential direction. An average value of the 18 thicknesses thus measured is calculated as the thickness T.

In a longitudinal vertical section of the groove 12a, desirably, an angle θ between a predetermined tangent A' which comes into contact with an inner shape of the groove 12a and a plane B' which is identical with the plane portion F of the mold 12 (hereinafter, referred to as an angle θ of the dug groove) is larger than 60°. Among tangents coming into contact with the inner shape of the groove 12a, the predetermined tangent A' corresponds to one which is largest in gradient with respect to the plane B'.

Thus, a rise angle θa of the protrusion to be formed on the duct is set to be larger than 45° with ease.

Figure 5A:
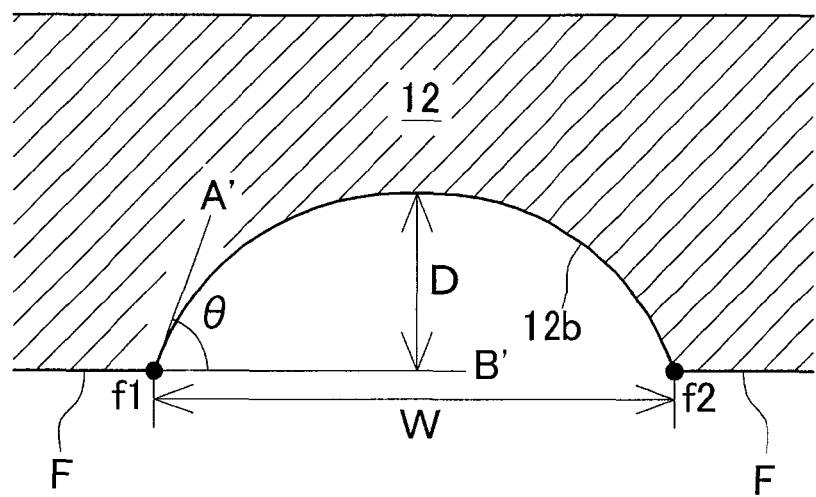
FIGS. 5A and 5B are sectional diagrammatic view each illustrating a shape of a groove formed on a mold according to a modification example.

In the mold 12 according to this embodiment illustrated in FIG. 4, the angle θ of the dug groove 12a is 90°. As illustrated in FIG. 5A, however, an angle θ of a dug groove 12b may be set at not more than 90°.

Figure 5B:
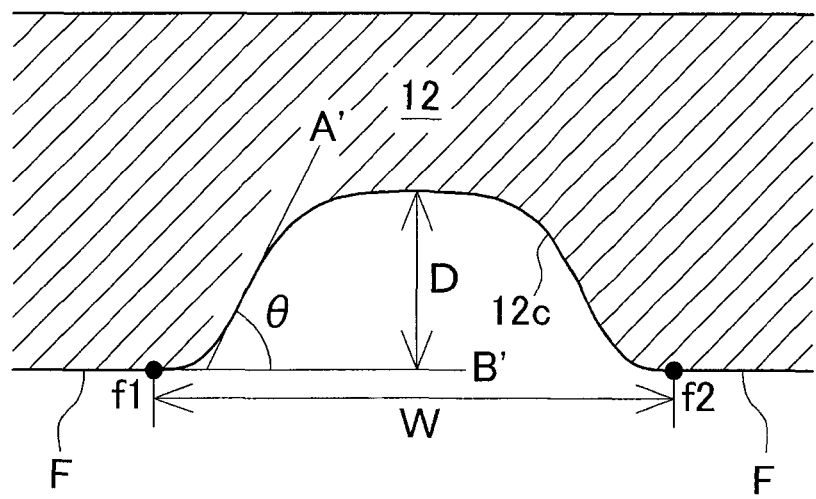

As illustrated in FIG. 5A, moreover, the plane portion F on the surface of the mold and an inner surface of the groove 12b may communicate with each other through a corner portion. As illustrated in FIG. 5B, alternatively, the plane portion F on the surface of the mold and an inner surface of a groove 12c may smoothly communicate with each other.

When the mold is configured and the thickness of the parison is adjusted as described above, the foamed resin is embedded in the groove of the mold with ease at the time of molding. Therefore, it is possible to form a protrusion which satisfactorily protrudes from the surface of the duct and to reduce a possibility that a deep recessed shape (i.e., a deep groove) is formed on the inner circumferential surface of the duct.

Thus, it is possible to mold a duct that is allowed to prevent a downward drop of condensed moisture generated on a surface thereof with increased reliability and to be hard to hinder ventilation of gas therein.

Herein, when the duct is molded under such a condition that an expansion ratio of the molded duct is not less than 1.5 times, an influence due to a fact that the outer peripheral surface of the duct is deformed along the mold is hard to be exerted on the inner circumferential surface of the duct. Therefore, the depth of the groove to be formed on the inner circumferential surface of the duct can be set smaller. In addition, when the expansion ratio is not less than 1.5 times, the molded duct can be reduced in weight and can be ensured in heat insulating property.

Moreover, when the duct is molded under such a condition that an expansion ratio of the molded duct is larger than 5.0 times, the foamed resin is not embedded so much in the groove of the mold since the foamed resin is hard to expand at the time of molding. In view of the fact described above, preferably, the duct is molded under such a condition that the expansion ratio of the molded duct is not more than 5.0 times. More preferably, the duct is molded under such a condition that the expansion ratio of the molded duct falls within a range from 1.5 times to 3.0 times.

Moreover, when the duct is molded under such a condition that an average bubble diameter of the molded duct exceeds 200 μm, the foamed resin is not embedded so much in the groove of the mold because of the bubble serving as resistance. In view of this fact, preferably, the duct is molded under such a condition that the average bubble diameter of the molded duct is not more than 200 μm. More preferably, the duct is molded under such a condition that the average bubble diameter is not more than 100 μm.

When the inner surface of the groove is subjected to blasting, air which is interposed between the inner surface of the groove and the foamed resin is escaped externally with ease at the time of molding. Thus, the foamed resin is embedded in the groove with great ease.

Figure 6:
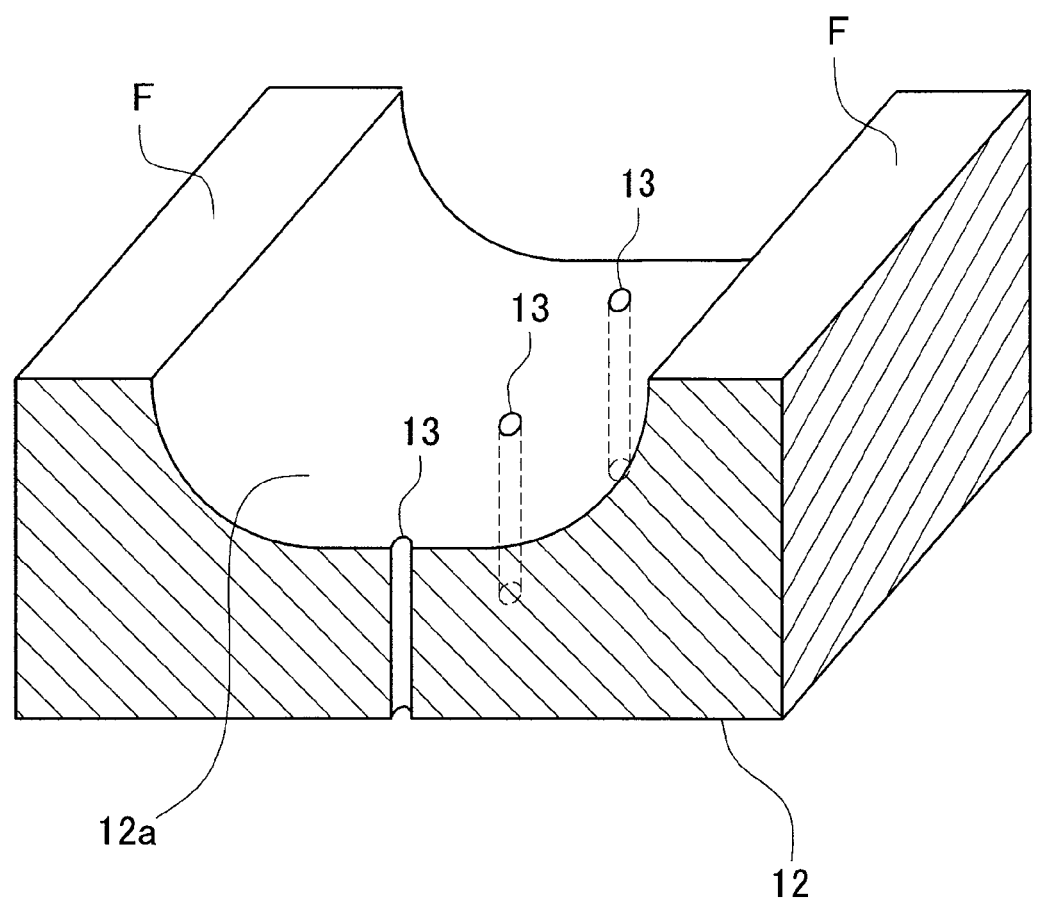
FIG. 6 is a perspective diagrammatic view illustrating a configuration that a communicating hole is fanned on a groove of a mold.

As shown in FIG. 6, moreover, a communicating hole (a degassing hole) 13 for communicating with the outside of the mold may be opened on the inner surface of the groove 12a of the mold 12.

According to this configuration, air which is interposed between the inner surface of the groove 12a and the parison 11 can be escaped externally with ease at the time of molding. Thus, the parison 11 is embedded in the groove with great ease.

Since the communicating hole 13 is opened at the deepest position of the groove 12a, this opening is hard to be clogged with the parison 11. Therefore, the air can be escaped externally with increased reliability.

Alternatively, a plurality of communicating holes 13 for communicating with the outside may be opened along the groove 12a of the mold 12. Thus, it is possible to further improve a characteristic of transferring the shape of the protrusion.

EXAMPLES

A foamed parison having a predetermined thickness was molded into a duct shape by use of a mold having a predetermined groove shape (W: a width, D: a depth). Thereafter, measurements were carried out with regard to a height Ha of a protrusion formed on an outer peripheral surface of the duct, a width Wa of the protrusion, a depth Da of a groove formed on an inner circumferential surface of the duct, and a thickness Ta of a wall of the duct. Table 1 shows evaluation results.

In a column of the height Ha of the protrusion and a column of the depth Da of the groove on the inner circumferential surface of the duct in Table 1, a ratio (%) of the height Ha and depth Da to the depth D of the groove of the mold is additionally described.

In Table 1, No. 3 indicates a result in a case where an inner surface of the groove is subjected to blasting. Also in Table 1, No. 4 and No. 5 each indicate a result in a case where a communicating hole for communicating with an outside of the mold is opened on a bottom of the groove.

A foamed resin to be used herein is a mixture of 3 parts by weight of 80% talc master batch and 1 part by weight of black master batch with a mixed resin obtained by mixing polypropylene (HMS-PP:block PP=70:15) and polyethylene (LL-DPE) at a ratio of 85:15.

TABLE 1

| | Mold | | | Foamed | Molded duct | | | |
|---|---|---|---|---|---|---|---|---|
| | Groove width W (mm) | Groove depth D (mm) | Groove processing | resin sheet Thickness T (mm) | Protrusion height Ha (mm) | Protrusion width Wa (mm) | Recess shape depth Da (mm) | Wall thickness Ta (mm) |
| No. 1 | 3 | 1 | — | 2.5 | 0.64 64% | 2.8 | 0.30 30% | 1.5 |
| No. 2 | 3 | 1.5 | — | 2.5 | 0.9 60% | 2.8 | 0.43 29% | 1.5 |
| No. 3 | 3 | 1 | Subjected to blasting | 2.5 | 0.71 71% | 2.7 | 0.33 33% | 1.5 |
| No. 4 | 3 | 1 | With communicating hole | 2.5 | 0.76 76% | 2.6 | 0.34 34% | 1.5 |

TABLE 1-continued

| | Mold | | | Foamed | Molded duct | | | |
|---|---|---|---|---|---|---|---|---|
| | Groove width W (mm) | Groove depth D (mm) | Groove processing | resin sheet Thickness T (mm) | Protrusion height Ha (mm) | Protrusion width Wa (mm) | Recess shape depth Da (mm) | Wall thickness Ta (mm) |
| No. 5 | 3 | 1.5 | With communicating hole | 2.5 | 1.13 75% | 2.7 | 0.49 33% | 1.5 |
| No. 6 | 3 | 1 | — | 2 | 0.7 70% | 2.8 | 0.33 33% | 1.2 |
| No. 7 | 4.5 | 2 | — | 3 | 1.4 70% | 4.1 | 0.67 34% | 1.8 |
| No. 8 | 3 | 1 | — | 1.5 | 0.75 75% | 2.8 | 0.60 60% | 0.9 |
| No. 9 | 1 | 1 | — | 2.5 | 0.42 42% | 0.9 | 0.20 20% | 1.5 |

Herein, the duct is molded such that a thickness Ta of a wall surface of the molded duct (i.e., a portion where no protrusion is formed) is about 60% of the thickness T of the foamed parison before being subjected to blowing.

Moreover, the width Wa of the protrusion of the molded duct is about 90% of the width W of the groove of the mold.

As shown in Table 1, in No. 1 to No. 7, as the implemental examples of the manufacturing method of the present invention, the height of the protrusion formed on the outer peripheral surface of the duct is not less than 60% of the depth of the groove of the mold. Accordingly, the shape of the groove of the mold is favorably transferred onto the foamed parison.

Further, the depth of the groove formed on the inner circumferential surface of the duct is not more than 40% as compared with the depth of the groove of the mold. In other words, the depth of the groove can be prevented from being excessively large in the inner circumferential surface of the duct. In this case, it is possible to prevent stagnation of a flow of air passing through the duct. That is, it is possible to improve ventilation efficiency of the duct.

For example, the ventilation efficiency can be evaluated based on the following equation:

Ventilation efficiency (%)=duct inlet air velocity (m/s)/duct outlet air velocity (m/s)×100.

With regard to No. 8 (having conditions identical with those of No. 6 except the thickness T of the foamed parison), on the other hand, the depth of the groove formed on the inner circumferential surface of the duct becomes large as compared with that in No. 6. For this reason, the duct in No. 8 is poor in ventilation efficiency as compared with the duct in No. 6.

With regard to No. 9 (having conditions identical with those of No. 1 except the width W of the groove of the mold), moreover, the height of the protrusion formed on the outer peripheral surface of the duct becomes low as compared with that in No. 1. In other words, the case of using the mold in No. 9 is inferior in protrusion shape transferring characteristic to the case of using the mold in No. 1.

It is apparent from the comparison between No. 1 and No. 3 that the protrusion formed on the outer peripheral surface of the duct can be made higher in height in such a manner that the groove of the mold is subjected to blasting. That is, it is possible to improve the protrusion shape transferring characteristic.

Moreover, it is apparent from the comparison between No. 1 and No. 4 and the comparison between No. 2 and No. 5 that the protrusion formed on the outer peripheral surface of the duct can be made higher in height in such a manner that the communicating hole for communicating with the outside of the mold is opened at the groove of the mold. That is, it is possible to improve the protrusion shape transferring characteristic.

With regard to No. 1 to No. 7, as shown in Table 2, in the molded duct, the width Wa of the protrusion, the height Ha of the protrusion, the thickness Ta of the wall, and the depth Da of the groove formed on the inner circumferential surface satisfy the following relations:

$0.5\ mm < Ha < 5\ mm,$ $2 \times Ha < Wa < 5 \times Ha,$ $Wa < 3 \times Ta,$ and $Da/Ha < 0.7.$

TABLE 2

| | 2 × Ha | Wa | 5 × Ha | 3 × Ta | Da | Da/Ha | Da/Wa |
|---|---|---|---|---|---|---|---|
| No. 1 | 1.28 | 2.8 | 3.2 | 4.5 | 0.3 | 0.47 | 0.11 |
| No. 2 | 1.8 | 2.8 | 4.5 | 4.5 | 0.43 | 0.48 | 0.15 |
| No. 3 | 1.42 | 2.7 | 3.55 | 4.5 | 0.33 | 0.46 | 0.12 |
| No. 4 | 1.52 | 2.6 | 3.8 | 4.5 | 0.34 | 0.45 | 0.13 |
| No. 5 | 2.26 | 2.7 | 5.65 | 4.5 | 0.49 | 0.43 | 0.18 |
| No. 6 | 1.4 | 2.8 | 3.5 | 3.6 | 0.33 | 0.47 | 0.12 |
| No. 7 | 2.8 | 4.1 | 7 | 5.4 | 0.67 | 0.48 | 0.16 |
| No. 8 | 1.5 | 2.8 | 3.75 | 2.7 | 0.6 | 0.80 | 0.21 |
| No. 9 | 0.84 | 0.9 | 2.1 | 4.5 | 0.2 | 0.48 | 0.22 |

With regard to the ducts in No. 1 to No. 7 and No. 9, the depth Da of the groove on the inner circumferential surface of the duct is smaller than 70% of the height Ha of the protrusion. Therefore, it is possible to prevent such a disadvantage that the ventilation of the gas in the duct is excessively hindered by the protrusion having a height capable of preventing a drop of condensed moisture adhering to the surface of the duct.

Desirably, the height of the protrusion is larger than 0.5 mm in order to prevent a drop of condensed moisture adhering to the surface of the duct. Also desirably, the height of the protrusion is smaller than 5 mm in order to reduce the bulk of the duct.

As a result of measurement about a rise angle θa of the protrusion of the duct, moreover, it was found out that the rise angle θa is larger than 45° in each duct.

As described above, it is possible to prevent a drop of condensed moisture adhering to the surface of the duct with increased reliability when the rise angle of the protrusion is larger than 45°.

With regard to the ducts in No. 1 to No. 7, a value of Da/Wa is not more than 0.20, so that the groove on the inner circumferential surface is formed gently as compared with those of the ducts in No. 8 and No. 9 in which the value of Da/Wa exceeds 0.20. Accordingly, the grooves on the inner circumferential surfaces of the ducts in No. 1 to No. 7 are hard to degrade the ventilation efficiency of the duct as compared with the grooves on the inner circumferential surfaces of the ducts in No. 8 and No. 9.

It is obvious from the experiments conducted by the present inventors that in a case where a duct is formed by blow molding, which is similar to that described above, from a non-foamed resin rather than a foamed resin, a groove on an inner circumferential surface of the duct, which corresponds to a protrusion, becomes larger in depth as compared with the case where the duct is formed from the foamed resin as described above. Accordingly, it is possible to mold a duct which is excellent in ventilation efficiency as compared with a duct formed from a non-foamed resin (a solid duct), in such a manner that a foamed resin is subjected to blow molding as in the foregoing embodiment.

The present invention is not limited to a technique to be applied to formation of a protrusion for preventing a drop of condensed moisture. The present invention is also directed to a technique which is applicable to formation of a character using a protrusion on a surface of a duct. According to the present invention, even in a case where a character is formed using a protrusion on a surface of a duct, it is possible to reduce such a possibility that the character hinders ventilation of gas in the duct.

With regard to industrial applicability, the present invention is usable as a method for manufacturing a climate control duct for use in automobiles and the like.

While the invention has been illustrated and described in detail, the foregoing description is in all aspects illustrative and not restrictive. It is therefore understood that numerous modifications and variations can be devised without departing from the spirit and scope of the invention.

What is claimed is:

1. A climate control duct obtained by molding a foamed resin while fitting the foamed resin to a shape of a mold by use of a pressurized fluid, the duct comprising a protrusion formed on an outer peripheral surface thereof, wherein the following relations are satisfied:

$0.5 \text{ mm} < Ha < 5 \text{ mm}$, $2 \times Ha < Wa < 5 \times Ha$, $Wa < 3 \times Ta$, and $Da/Ha < 0.7$, in which Wa represents a width of the protrusion, Ha represents a height of the protrusion, Ta represents a thickness of a wall at a portion where the protrusion is not formed, and Da represents a depth of a groove to be formed on an inner circumferential surface in correspondence with the protrusion.

2. The climate control duct according to claim 1, wherein the protrusion has a rise angle of not less than 45°.

* * * * *